US012288631B2

United States Patent
Muto et al.

(10) Patent No.: US 12,288,631 B2
(45) Date of Patent: Apr. 29, 2025

(54) INSULATED WIRE, COIL, AND ELECTRICAL OR ELECTRONIC EQUIPMENT

(71) Applicant: Essex Furukawa Magnet Wire Japan Co., Ltd., Tokyo (JP)

(72) Inventors: Daisuke Muto, Tokyo (JP); Keiichi Tomizawa, Tokyo (JP); Hideo Fukuda, Tokyo (JP)

(73) Assignee: ESSEX FURUKAWA MAGNET WIRE JAPAN CO., LTD., Tokyo (JP)

( * ) Notice: Subject to any disclaimer, the term of this patent is extended or adjusted under 35 U.S.C. 154(b) by 700 days.

(21) Appl. No.: 17/370,134

(22) Filed: Jul. 8, 2021

(65) Prior Publication Data

US 2021/0343446 A1 Nov. 4, 2021

Related U.S. Application Data

(63) Continuation of application No. PCT/JP2020/011211, filed on Mar. 13, 2020.

(30) Foreign Application Priority Data

May 24, 2019 (JP) .................. 2019-097354

(51) Int. Cl.
*H01B 3/30* (2006.01)
*H02K 3/30* (2006.01)
*H02K 3/40* (2006.01)

(52) U.S. Cl.
CPC ............. *H01B 3/306* (2013.01); *H01B 3/305* (2013.01); *H02K 3/30* (2013.01); *H02K 3/40* (2013.01)

(58) Field of Classification Search
None
See application file for complete search history.

(56) References Cited

U.S. PATENT DOCUMENTS

| | | | |
|---|---|---|---|
| 2014/0305676 A1* | 10/2014 | Sugiyama | H01B 11/1839 174/102 R |
| 2014/0354394 A1 | 12/2014 | Oya et al. | |
| 2015/0034360 A1 | 2/2015 | Muto et al. | |
| 2015/0325333 A1 | 11/2015 | Muto et al. | |

FOREIGN PATENT DOCUMENTS

| | | | |
|---|---|---|---|
| EP | 2555204 | * | 2/2013 |
| EP | 2 824 673 A1 | | 1/2015 |
| EP | 2824673 | * | 1/2015 |
| EP | 2 955 725 A1 | | 12/2015 |

(Continued)

OTHER PUBLICATIONS

Machine translation of JP6055470 (Year: 2016).*

(Continued)

*Primary Examiner* — Shawn Mckinnon
(74) *Attorney, Agent, or Firm* — Birch, Stewart, Kolasch & Birch, LLP

(57) ABSTRACT

An insulated wire including: a conductor; and an insulating film provided on an outer periphery of the conductor, wherein the insulating film satisfies the following relation between a relative permittivity ($\varepsilon$) of the insulating film at 0.2 atm and a relative permittivity ($\varepsilon_0$) of an outermost layer of the insulating film at 0.2 atm.

$\varepsilon \leq 3.0$ and $\varepsilon_0/\varepsilon \geq 1.2$.

8 Claims, 1 Drawing Sheet

(56) References Cited

FOREIGN PATENT DOCUMENTS

| | | | |
|---|---|---|---|
| EP | 2955725 | * | 12/2015 |
| EP | 3 118 859 A1 | | 1/2017 |
| JP | 6055470 | * | 12/2016 |
| WO | WO2013/133333 A1 | | 9/2013 |
| WO | WO2013/133334 A1 | | 9/2013 |
| WO | WO2014/123123 A1 | | 8/2014 |

OTHER PUBLICATIONS

International Search Report, issued in PCT/JP2020/011211, PCT/ISA/210, dated Jun. 2, 2020.
Extended European Search Report for corresponding European Application No. 20813790.1, dated May 8, 2023.

* cited by examiner

INSULATED WIRE, COIL, AND ELECTRICAL OR ELECTRONIC EQUIPMENT

CROSS-REFERENCE TO RELATED APPLICATIONS

This application is a Continuation of PCT International Application No. PCT/JP2020/011211 filed on Mar. 13, 2020, which claims priority under 35 U.S.C. § 119 (a) to Japanese Patent Application No. 2019-097354 filed in Japan on May 24, 2019. Each of the above applications is hereby expressly incorporated by reference, in its entirely, into the present application.

FIELD OF THE INVENTION

The present invention relates to an insulated wire, a coil, and an electrical or electronic equipment.

BACKGROUND OF THE INVENTION

In an inverter-related device (such as coils for electrical or electronic equipment, including high-speed switching devices, inverter motors, transformers, and the like), an insulated wire in which an insulating film containing an insulating resin is provided on the outer periphery of a conductor is used as a magnet wire.

With the spread of hybrid cars and electric cars, improvement of motor efficiency is demanded, and operation of motors at high voltages and inverter control are demanded. When the insulated wire is used under such a high voltage, partial discharge (corona discharge) is likely to occur on the surface of the insulating film, which may deteriorate the insulating film. In order to suppress such partial discharge, it is known that the insulating film is formed to be thick to a certain extent, or the insulating film is formed as a foam layer to reduce a relative permittivity (for example, Patent Literature 1). In addition, it is also known that an insulating layer containing a partial discharge resistant material such as titanium dioxide is provided to suppress deterioration due to partial discharge (for example, Patent Literature 1).

CITATION LIST

Patent Literatures

Patent Literature 1: WO 2013/133334 A

SUMMARY OF THE INVENTION

Technical Problem

In recent years, electrification of aircrafts and the like is progressing, and there are more opportunities to use coils for electrical or electronic equipment at high altitude (under a low-pressure environment). As a result of studies by the present inventors, it has been found that, under a low-pressure environment such as a flight environment of an aircraft, partial discharge is likely to occur in an insulated wire constituting a coil, and thus, dielectric breakdown of the wire is likely to occur. That is, in a case where the coil for electrical or electronic equipment is mounted on an aircraft or the like, more restriction is imposed on working voltage or the like than when it is used on a flat ground.

In view of this, the present invention provides an insulated wire that is less likely to cause partial discharge even when used in a low-pressure environment, a coil using the insulated wire, and electrical or electronic equipment using the coil.

Solution to Problem

In view of the above problems, the present inventors have repeated intensive studies, and as a result, have found that the above problems can be solved by increasing the value of a ratio of the relative permittivity of an outermost layer of an insulating film of an insulated wire to a specific value or more while decreasing the relative permittivity of the entire insulating film to a specific level. That is, the inventors of the present invention have found that the above problem can be solved by intentionally increasing the relative permittivity of the outermost layer of the insulating film to a specific level, while the development of insulated wires is advanced toward suppressing partial discharge of the insulated wires as much as possible by reducing the relative permittivity of the insulating film as much as possible, and thus, completed the present invention.

The above problems of the present invention are solved by the following means.

[1]
An insulated wire, including:
a conductor; and
an insulating film provided on an outer periphery of the conductor, wherein the insulating film satisfies the following relation at 0.2 atm between a relative permittivity ($\varepsilon$) of the insulating film and a relative permittivity ($\varepsilon_0$) of an outermost layer of insulating layers constituting the insulating film:

$\varepsilon \leq 3.0$ and $\varepsilon_0/\varepsilon \geq 1.2$.

[2]
The insulated wire described in the item [1], wherein at least one of the insulating layers constituting the insulating film is a bubble-containing layer.
[3]
The insulated wire described in the item [2], wherein a porosity of the bubble-containing layer is 5 to 70 vol %.
[4]
The insulated wire described in the item [2] or [3], wherein the bubble-containing layer is an enamel layer formed by baking a thermosetting resin.
[5]
The insulated wire described in any one of the items [1] to [4], wherein the outermost layer of the insulating film contains an inorganic microparticle.
[6]
The insulated wire described in the item [5], wherein the inorganic microparticle contains titanium dioxide.
[7]
The insulated wire according to any one of the items [1] to [6], wherein the insulating film satisfies the following relation between a thickness (T) of the insulating film and a thickness ($T_0$) of the outermost layer of the insulating film:

$0 < T_0/T \leq 0.1$ and $T \geq 30$ µm.

[8]
A coil, including the insulated wire described in any one of the items [1] to [7].
[9]
An electrical or electronic equipment, including the coil described in the item [8].

In the description of the present invention, any numerical expressions in a style of " . . . to . . . " will be used to indicate a range including the lower and upper limits represented by the numerals given before and after "to", respectively.

Advantageous Effects of Invention

The insulated wire, the coil, and the electrical or electronic equipment according to the present invention is less likely to cause partial discharge of the insulated wire even when used in a low-pressure environment.

DESCRIPTION OF EMBODIMENTS

[Insulated Wire]

Hereinafter, a preferable embodiment of the insulated wire of the present invention will be described.

Figure 1:
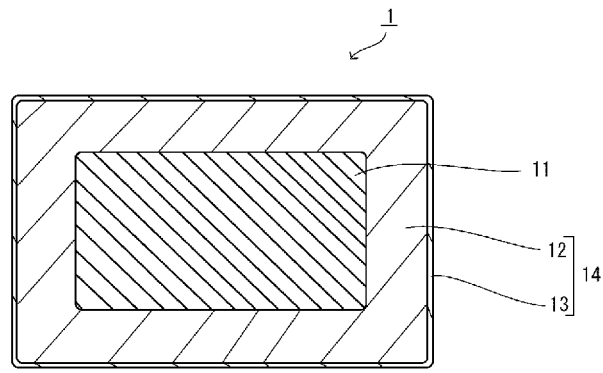
FIG. 1 is a schematic sectional view showing one embodiment of the insulated wire of the present invention.

FIG. 1 shows a preferred embodiment of the insulated wire of the present invention. The insulated wire 1 of the present invention has an insulating film 14 on the outer periphery of a conductor 11. The insulating film 14 has a multilayer structure including two or more insulating layers, and FIG. 1 shows an insulating film that has two insulating layers including an insulating layer 12 and an insulating layer 13 (outermost layer). It is also preferable that the insulating film 14 has three or more layers. In the following description, when simply referred to as the "insulating film 14", this term is not limited to mean an insulating film having two-layer structure shown in FIG. 1, but means all insulating films including two or more insulating layers.

The thickness of the insulating film 14 is preferably 10 to 300 μm, more preferably 20 to 200 μm, further preferably 30 to 200 μm, still further preferably 35 to 200 μm, and most preferably 40 to 180 μm.

<Conductor>

As the conductor used in the present invention, a material conventionally used as a conductor of an insulated wire can be widely used. Examples thereof include a metal conductor such as a copper wire or an aluminum wire.

In FIG. 1, the conductor has a rectangular cross section (is of a flat type). However, the cross sectional shape of the conductor is not particularly limited, and it may be any desired shape such as square, round, or ellipse.

In view of suppressing partial discharge from a corner portion, the flat-type conductor has preferably a shape in which four corners are chamfered (with a curvature radius r). The curvature radius r is preferably 0.6 mm or less, and more preferably in a range from 0.2 to 0.4 mm.

The size of the conductor is not particularly limited. To give an example, when the conductor has a rectangular shape, the width (long side) thereof is preferably from 1.0 to 5.0 mm, and more preferably from 1.4 to 4.0 mm in rectangular cross section. The thickness (short side) is preferably from 0.4 to 3.0 mm, and more preferably from 0.5 to 2.5 mm. The ratio of length (thickness:width) between the width (long side) and the thickness (short side) is preferably from 1:1 to 1:4. When the conductor has a circular cross section, the diameter is preferably 0.3 to 3.0 mm, and more preferably 0.4 to 2.7 mm.

<Insulating Film>

As described above, the insulating film 14 has a multilayer structure including two or more layers. In the present invention, when the constituent materials of the adjacent insulating layers constituting the insulating film 14 are different from each other, the two adjacent insulating layers are different layers (that is, two layers adjacent to each other constitute a two-layer structure).

Even in a case where the insulating layers adjacent to each other include the same material as the constituent materials, the two layers adjacent to each other constitute a two-layer structure when the two layers can be determined as different layers because: one of the layers contains bubbles; both layers contain bubbles with the content of bubbles, diameter of the bubble, etc. being different between the layers; or microparticles are added. Even when a bubble layer is formed as the outermost layer of the insulating film, in a mode in which a so-called skin layer having no bubbles is provided on the outermost surface of the bubble layer, the skin layer is regarded as another layer different from the bubble layer (that is, the bubble layer and the skin layer on the surface thereof constitute a two-layer structure, and the skin layer is the outermost layer).

On the other hand, when the constituent materials of the insulating layers adjacent to each other are the same and the structures (state of bubbles, state of microparticles, and the like) in the respective layers are the same, the two adjacent insulating layers are regarded as one insulating layer even if the respective layers are formed separately.

The insulating film 14 has preferably a structure having two to five layers, more preferably a structure having two to four layers, and still more preferably a structure having two or three layers.

The insulating film 14 satisfies the following relation between the relative permittivity (ε) of the entire insulating film 14 at 0.2 atm (1 atm is 101325 Pa) and the relative permittivity ($\varepsilon_0$) of the outermost layer of the insulating film at 0.2 atm:

$\varepsilon \leq 3.0$ and $\varepsilon_0/\varepsilon \geq 1.2$.

The relative permittivity can be determined by the method described in Examples described later. In addition, it can also be determined using an electron energy loss spectroscopy (EELS), etc. mounted on a transmission electron microscopy (TEM). In the EELS, a local permittivity can be evaluated.

The temperature condition in the measurement of the relative permittivity is 150° C.

When the relative permittivity of the outermost layer of the insulating film is increased with $\varepsilon \leq 3$ and $\varepsilon_0/\varepsilon \geq 1.2$ being satisfied, partial discharge under a low-pressure environment can be effectively and sufficiently suppressed. That is, it is possible to make the insulated wire suitable for application to an aircraft or the like. The reason for this is not clear, but it is considered that: in a low-pressure environment with a low air density (oxygen concentration), initial electrons emitted from the surface of the film are more likely to trigger partial discharge than electric charges in the environment; and under such an environment, increasing the relative permittivity of the insulating film in a limited area such as the outermost layer enables reduction in electric field of the outermost layer while decreasing the relative permittivity of the entire insulating film, so that generation of the initial electrons from the outermost layer can be effectively suppressed.

The relative permittivity (ε) of the entire insulating film at 0.2 atm is preferably 2.8 or less, more preferably 2.7 or less, further preferably 2.6 or less, still further preferably 2.5 or less, still further preferably 2.4 or less, still further preferably 2.3 or less, and most preferably 2.2 or less. In addition, the lower limit of the relative permittivity (ε) is not particularly limited. It is commonly 1.0 or more, and practically 1.4 or more.

The relative permittivity (ε) of the insulating film including n layers which are laminated on a flat conductor in a parallel plate shape is calculated by Equation (1) below, where the relative permittivities of the layers constituting the insulating film are represented by ε1, ε2, . . . εn in order from the conductor side, and the thicknesses of the layers constituting the insulating film are represented by t1, t2 . . . tn in order from the conductor side.

$$\varepsilon = (t1+t2+\ldots+tn)/[(t1/\varepsilon 1)+(t2/\varepsilon 2)+\ldots+(tn/\varepsilon n)] \quad \text{Equation (1):}$$

In addition, the relative permittivity (ε) of the insulating film including n layers which are coaxially and cylindrically laminated on the outer periphery of a cylindrical conductor is calculated by Equation (2) below, where the relative permittivities of the layers constituting the insulating film are represented by ε1, ε2, . . . εn in order from the conductor side, the outside diameter of the conductor is represented by R0, and the outside diameters of the layers constituting the insulating film are represented by R1, R2 . . . Rn in order from the conductor side.

$$\varepsilon = \log(Rn/R0)/[(\log(R1/R0)/\varepsilon 1)+(\log(R2/R1)/\varepsilon 2)+\ldots+(\log(Rn/R(n-1)/\varepsilon n))] \quad \text{Equation (2):}$$

For example, when the insulating film has two layers laminated in a parallel flat plate shape, the inner layer (conductor side) has a relative permittivity of 2.0 and a thickness of 40 μm, and the outer layer (outermost layer) has a relative permittivity of 4.0 and a thickness of 20 μm, the following equation is established.

Relative permittivity (ε)=(40+20)/[(40/2.0)+(20/4.0)]=2.4

The relative permittivity ($\varepsilon_O$) of the outermost layer of the insulating film at 0.2 atm is preferably 2.8 or more, 3.0 or more, or 3.2 or more. The relative permittivity ($\varepsilon_O$) is preferably 6.0 or less, 5.0 or less, or 4.8 or less.

The "$\varepsilon_O/\varepsilon$" is preferably 1.3 or more, more preferably 1.4 or more, and further preferably 1.5 or more or 1.6 or more.

At least one of the plurality of insulating layers constituting the insulating film 14 is preferably a bubble-containing layer (bubble layer). The average bubble diameter of bubbles constituting the bubble layer is preferably 10 μm or less although it depends on the thickness of the bubble layer. The average bubble diameter of the bubbles constituting the bubble layer is preferably 7 μm or less, or 5 μm or less. The average bubble diameter of the bubbles constituting the bubble layer is commonly 0.1 μm or more.

The average bubble diameter can be determined by calculating an average bubble diameter of 20 bubbles selected at random in a scanning electron microscope (SEM) image of a cross section of the insulating layer in a thickness direction using image dimension measurement software (Pixs2000_Pro manufactured by Inotech Co., Ltd.) in a diameter measurement mode.

The bubble layer preferably has a porosity (a ratio of a volume of a bubble portion to the bubble layer) of 5 to 70 vol %, more preferably 10 to 60 vol %, and still more preferably 20 to 50 vol %.

Such a bubble layer can be formed, for example, by generating desired bubbles when an enamel layer is formed by baking a thermosetting resin. For example, the bubble layer can be formed by applying an insulating varnish, which is obtained by mixing an organic solvent as a main solvent component of the varnish with at least one kind of high-boiling point solvent as a cell nucleating agent or a foaming agent, on the outer periphery of the conductor, and baking the applied insulating varnish. The method for forming the bubble layer is known in the technical field of the present invention, and for example, WO 2013/133334 A can be referred to.

The insulating film 14 constituting the insulated wire of the present invention preferably has a bubble layer as a layer other than the outermost layer. In this case, the outermost layer is preferably not the skin layer described above (for example, it is preferable that an insulating paint is applied to the outer periphery of the bubble layer and baked to form another insulating layer on the outer periphery of the bubble layer). This adhesion layer can be, for example, an insulating layer formed using the same constituent material as the bubble layer without foaming the material.

In the insulated wire of the present invention, it is preferable that the insulating film 14 has a structure including three or more insulating layers, and at least one layer other than the innermost layer (layer in contact with the conductor) and other than the outermost layer is a bubble layer. In this case, the insulating film preferably includes three to five insulating layers, or three or four insulating layers.

It is also preferable that, in the insulated wire of the present invention, the outermost layer of the insulating film 14 contains inorganic microparticles. The inorganic microparticles act as a partial discharge resistant material, and can contribute to improvement of the electrical life characteristics of the insulated wire. The inorganic microparticle preferably has a primary particle diameter of 1 μm or less (preferably, a primary particle diameter of 1 nm or more and 500 nm or less). The primary particle diameter of the inorganic microparticle can be determined by calculating an average particle diameter of 20 primary particles selected at random in a scanning electron microscope (SEM) image using image dimension measurement software (Pixs2000_Pro manufactured by Inotech Co., Ltd.) in a diameter measurement mode.

Specific examples of the inorganic microparticles include silica ($SiO_2$), titanium dioxide, alumina, barium titanate, zinc oxide, and gallium nitride. Among them, silica and/or titanium dioxide is preferable, and titanium dioxide is more preferable.

When the inorganic microparticles are incorporated in the outermost layer of the insulating film, the content of the inorganic microparticles in the outermost layer is preferably 5 to 40 parts by mass, and more preferably 10 to 30 parts by mass with respect to 100 parts by mass of a component (typically, an insulating resin component) other than the inorganic microparticles in the outermost layer.

The insulating film 14 preferably satisfies the following relation between the total thickness (T) of the insulating film 14 and the thickness ($T_O$) of the outermost layer of the insulating film. The units of T and $T_O$ are both "μm".

$$0 < T_O/T \leq 0.1 \text{ and } T \geq 30 \text{ μm}$$

When T and $T_O$ satisfy the above relation, the release of initial electrons from the surface of the film can be suppressed with the relative permittivity of the entire insulating layer being further decreased, whereby the occurrence of partial discharge can be more effectively suppressed.

The thickness (T) of the insulating film 14 may be 35 µm or more, or 40 µm or more. The thickness (T) is preferably 300 µm or less, more preferably 200 µm or less, and still more preferably 180 µm or less or 160 µm or less.

The thickness ($T_O$) of the outermost layer of the insulating film 14 is preferably 0.1 µm or more, 0.3 µm or more, 1 µm or more, 2 µm or more, or 3 µm or more. The thickness ($T_O$) is preferably 30 µm or less, more preferably 20 µm or less, and still more preferably 15 µm or less.

The "$T_O/T$" is preferably 0.03 or more, and more preferably 0.04 or more or 0.05 or more.

As a constituent material of each insulating layer constituting the insulating film 14, a material generally used as a constituent material of this type of insulating layer can be widely applied. Examples of the constituent material of each insulating layer include a resin material containing at least one kind of material selected from polyaryletherketone, polyetherketone, polyetheretherketone, polyphenylene sulfide, polyethylene terephthalate, polyethylene naphthalate, aromatic polyamide, polytetrafluoroethylene, tetrafluoroethylene-hexafluoropropylene copolymer, tetrafluoroethylene-ethylene copolymer, tetrafluoroethylene-perfluoroalkylvinyl ether copolymer, polyetherimide, polyethersulfone, polyphenylene ether, polyphenylsulfone, polyimide, polyamide imide, thermoplastic polyimide, and polyketone. Particularly, it is preferable that a resin material containing at least one kind of polyimide and polyamide imide is used as the constituent material of the insulating layer, and it is more preferable that the insulating layer is made of a resin material containing polyimide or polyamide imide.

In addition, various additives may be added to the constituent material of the insulating layer as long as the effect of the present invention is not impaired. Examples of such additives include a cell nucleating agent, an antioxidant, an antistatic agent, an ultraviolet inhibitor, a light stabilizer, a fluorescent brightening agent, a pigment, a dye, a compatibilizing agent, a lubricating agent, a reinforcing agent, a flame retardant, a crosslinking agent, a crosslinking aid, a plasticizer, a viscosity increaser, a viscosity reducer, and an elastomer.

[Production of Insulated Wire]

The insulated wire according to the present invention can be obtained by, for example, repeatedly applying a varnish containing a constituent material (insulating resin) of the insulating layer and an organic solvent for dissolving the same to the periphery of the conductor and baking the varnish to form the insulating layer. Due to the baking, the solvent in the varnish is volatilized and removed. Examples of the organic solvent include: amide solvents such as N-methyl-2-pyrrolidone (NMP), N,N-dimethylacetamide (DMAC), and N,N-dimethylformamide (DMF); urea solvents such as N,N-dimethylethyleneurea, N,N-dimethylpropyleneurea, and tetramethylurea; lactone solvents such as γ-butyrolactone and γ-caprolactone; carbonate solvents such as propylene carbonate; ketone solvents such as methyl ethyl ketone, methyl isobutyl ketone, and cyclohexanone; ester solvents such as ethyl acetate, n-butyl acetate, butyl cellosolve acetate, butyl carbitol acetate, ethyl cellosolve acetate, and ethyl carbitol acetate; glyme solvents such as diglyme, triglyme, and tetraglyme; hydrocarbon solvents such as toluene, xylene, and cyclohexane; phenol solvents such as cresol, phenol, and halogenated phenol; sulfone solvents such as sulfolane; and dimethyl sulfoxide (DMSO).

The insulated wire of the present invention can also be obtained by forming, by extrusion, a thermoplastic constituent material (extrusion resin) on the outer periphery of the conductor or on the outer periphery of the insulating layer formed on the outer periphery of the conductor.

As described above, a desired foam layer can be formed by blending a cell nucleating agent or a foaming agent into the varnish or the extrusion resin.

[Coil and Electrical or Electronic Equipment]

The insulated wire of the present invention is applicable, as a coil, to a field which requires electrical properties (resistance to voltage) and heat resistance, such as various kinds of electrical or electronic equipment. For example, the insulated wire of the present invention is used for a motor, a transformer, and the like, by which high-performance electrical or electronic equipment can be obtained. In particular, the insulated wire is preferably used as a winding wire for driving motors of a hybrid vehicle (HV) and an electric vehicle (EV). As descried above, according to the present invention, it is possible to provide electrical or electronic equipment using the insulated wire of the present invention as a coil, such as driving motors of HV and EV.

The coil of the present invention is not particularly limited, as long as it has a form suitable for any of various kinds of electrical or electronic equipment, and examples thereof include: a coil formed by subjecting the insulated wire of the present invention to coil processing; and a coil formed such that, after the insulated wire of the present invention is bent, predetermined parts thereof are electrically connected.

The coil formed by subjecting the insulated wire of the present invention to coil processing is not particularly limited, and examples thereof include a coil formed by winding a long insulated wire in a spiral. In such a coil, the number of turns of the insulated wire is not particularly limited. Commonly, an iron core or the like is used to wind the insulated wire in a spiral.

Figure 2:
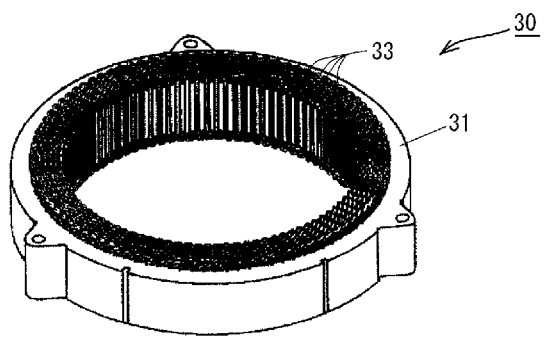
FIG. 2 is a schematic perspective view showing a preferable embodiment of a stator to be used in electrical or electronic equipment of the present invention.
Figure 3:
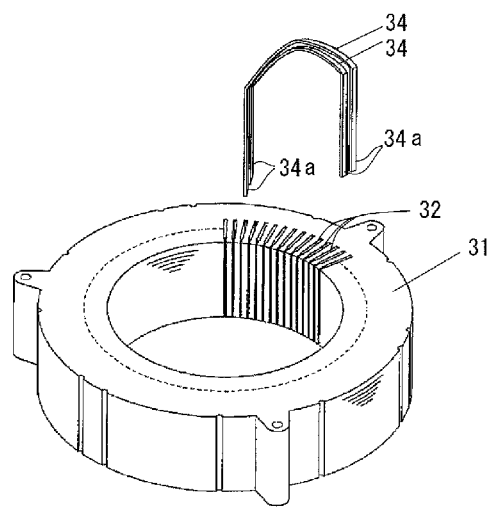
FIG. 3 is a schematic exploded perspective view showing a preferable embodiment of the stator to be used in the electrical or electronic equipment of the present invention.

Examples of the coil formed such that, after the insulated wire of the present invention is bent, predetermined parts thereof are electrically connected include a coil used for a stator of a rotating electrical machine, or the like. A coil 33 (see FIG. 2) is an example of such coil. The coil 33 is formed by cutting the insulated wire of the present invention in a prescribed length, bending the cut pieces in a U shape or the like to form a plurality of wire segments 34, and alternately connecting two open ends (terminals) 34a of the U shape or the like of each wire segment 34, as shown in FIG. 3.

The electrical or electronic equipment using the coil thus manufactured is not particularly limited. One preferred mode of such electrical or electronic equipment is a transformer. In addition, examples of the preferred mode thereof include a rotating electrical machine (particularly, driving motors of HV and EV) including the stator 30 illustrated in FIG. 2. Such rotating electrical machine can be configured similar to a conventional rotating electrical machine except for being equipped with the stator 30.

The stator 30 has a configuration similar to a configuration of a conventional stator except that the wire segments 34 are manufactured using the insulated wire of the present invention. Specifically, the stator 30 has a stator core 31, and the coil 33 in which, as shown in FIG. 2, the wire segments 34 produced using the insulated wire of the present invention are incorporated in slots 32 of the stator core 31 and open ends 34a are electrically connected. The coil 33 is fixed such that adjacent fusing layers, or the fusing layer and the slot 32 are bonded. Herein, the wire segment 34 may be placed in each slot 32 one by one. However, it is preferable that a pair of wire segments 34 is placed in each slot 32 as shown in FIG. 3. In the stator 30, the coils 33, which are formed by alternately connecting the open ends 34a that are two ends of the wire segments 34 which have been bent as described above, are housed in the slots 32 of the stator core 31. At this time, the wire segments 34 may be placed in the slots 32 after the open ends 34a thereof are connected. Alternatively, after the wire segments 34 are placed in the slots 32, the open ends 34a of the wire segments 34 may be bent and connected.

The present invention will be described in more detail based on Examples given below. However, it is to be noted that the present invention is not limited to the following Examples.

EXAMPLES

[Production Example 1] Production of Insulated Wire

<Conductor 11>

A copper wire having a circular cross section (outside diameter of cross section: 1 mm) was used as the conductor 11.

<Insulating Paint-I>

A polyimide (PI) resin varnish (Trade name: U-imide, manufactured by Unitika Ltd.) was used as the insulating paint-I. This PI resin varnish is prepared by dissolving a polyamic acid as a polyimide precursor in a solvent, and a PI resin layer is formed by coating and baking described later.

<Insulating Paint-II>

A polyamide imide (PAI) resin varnish (Trade name: HI-406, manufactured by Hitachi Chemical Co., Ltd.) was used as an insulating paint-II.

<Insulated Wire>

A die was set so that the film thickness after drying was 3 μm, and the insulating paint-I was applied to the outer peripheral surface of the conductor to form a coating film.

Using a hot air circulated vertical furnace of about 10 m, baking was performed at 520° C. for 10 to 20 seconds. The coating and baking were repeated 15 times to form an insulating layer-I having an insulating film thickness of 45 μm.

Next, the die was set so that the film thickness after drying was 2.5 μm, and the insulating paint-II was applied to the outer peripheral surface of the insulating layer-I to form a coating film.

Using a hot air circulated vertical furnace of about 10 m, baking was performed at 520° C. for 10 to 20 seconds. The coating and baking were repeated twice to form an insulating layer-II (outermost layer) having an insulating film thickness of 5 μm.

In this way, the insulated wire of Example 1 including the insulating film having a two-layer structure of the insulating layer-I and the insulating layer-II around the conductor was obtained.

Production Examples 2 to 6 and Comparative Production Examples 1 to 3

Production of Insulated Wire

Insulated wires of Examples 2 to 6 and Comparative Examples 1 to 3 were obtained in the same manner as in Production Example 1 except that the constituent material and thickness of each insulating layer constituting the insulating film were changed as follows.

In the following Table, the insulating layer 1 is a layer in contact with the conductor, the insulating layer 2 is a layer provided on the outer periphery of the insulating layer 1 and is located closer to the conductor than the outermost layer, and the insulating layer 3 is the outermost layer.

In the following Table, the "PI" layer is an insulating layer formed using the insulating paint-I, and the "PAI" layer is an insulating layer formed using the insulating paint-II.

In the following Table, the "bubble PI" layer was formed by adding N,N-dimethylacetamide and tetraethylene glycol dimethyl ether as solvents to the insulating paint-I, and performing coating and baking in the same manner as described above. The average bubble diameter of bubbles formed in the "bubble PI" layer was between 1 to 3 μm, and the porosity of the "bubble PI" layer was between 20 to 50 vol %.

In the following Table, the "PI+$SiO_2$" layer was formed by blending silica ($SiO_2$, primary particle diameter: 15 nm) with a ratio between the blending amount of polyamic acid and the blending amount of silica being 100:20 by mass ratio in the insulating paint-I, and coating and baking the resultant. In addition, the "PI+$TiO_2$" layer was similarly formed by blending titanium dioxide ($TiO_2$, primary particle diameter: 15 nm) with a ratio between the blending amount of polyamic acid and the blending amount of titanium dioxide being 100:30 by mass ratio in the insulating paint-I, and coating and baking the resultant.

[Relative Permittivity]

The relative permittivity of each insulating layer constituting the insulating film was determined as follows. Specifically, insulated wires each having only one insulating layer corresponding to each insulating layer as the insulating film on the outer periphery of the conductor 11 (insulated wires in which insulating films have a one-layer structure) were produced, their electrostatic capacitances were measured, and relative permittivity obtained from the electrostatic capacitance and the thickness of the insulating film was determined as the relative permittivity of each insulating layer. An LCR HiTESTER (Model IM 3536 manufactured by HIOKI E.E. Corporation) was used for measuring electrostatic capacitances. As measurement conditions, the measurement temperature was 150° C., the measurement atmospheric pressure was 0.2 atm, and the measurement frequency was 1 kHz.

The relative permittivity was calculated by the following equation.

$$\text{Relative permittivity } \varepsilon r^* = Cp \cdot \text{Log}(b/a)/(2\pi\varepsilon_0)$$

In the equation, $\varepsilon r^*$ denotes relative permittivity of the insulating layer, Cp denotes the electrostatic capacitance [pF/m] per unit length, a denotes the outside diameter of the conductor, b denotes the outside diameter of the insulated wire, and $\varepsilon_0$ denotes the vacuum permittivity ($8.855 \times 10^{-12}$ [F/m]), respectively.

From the obtained relative permittivity of each insulating layer, the relative permittivity of the entire insulating film was determined by Equation (2) mentioned above.

[Partial Discharge Inception Voltage (PDIV)]

A test piece in which two insulated wires were twisted in a twisted manner was prepared. An alternating-current voltage of a sine wave of 50 Hz was applied between the respective conductors, and a voltage (effective value) when the discharge charge amount was 10 pC was measured while continuously increasing the voltage. The measured values were evaluated on the basis of evaluation criteria described below. The measurement temperature was set to normal temperature (20° C.), and the measurement was performed under different atmospheric pressures of 1 atm and 0.2 atm. A partial discharge tester (KPD 2050 manufactured by KIKUSUI ELECTRONICS CORPORATION) was used to measure the partial discharge inception voltage.

—Evaluation Criteria for Partial Discharge Inception Voltage—

<Partial Discharge Inception Voltage at 1 atm>
  ⊙+: 1500 Vrms or more
  ⊙: 1000 Vrms or more and less than 1500 Vrms
  ○: 500 Vrms or more and less than 1000 Vrms
  x: less than 500 Vrms <Partial Discharge Inception Voltage at 0.2 atm (Partial Discharge Inception Voltage Retention Rate (%))>
  ⊙: 70%≤100×(partial discharge inception voltage at 0.2 atm)/(partial discharge inception voltage at 1 atm)
  ○: 65%≤100×(partial discharge inception voltage at 0.2 atm)/(partial discharge inception voltage at 1 atm)<70%
  x: 100×(partial discharge inception voltage at 0.2 atm)/(partial discharge inception voltage at 1 atm)<65%

[Electrical Life]

Two electric wires were twisted, an alternating-current voltage (sine wave: 10 kHz) having a magnitude of 1.5 times a partial discharge inception voltage at 0.2 atm was applied between the respective conductors, and a time until dielectric breakdown occurred was measured. The measurement results were evaluated on the basis of the following evaluation criteria. The measurement temperature was set to normal temperature (20° C.), and the measurement was performed under a low pressure of 0.2 atm. The product in which the time until dielectric breakdown occurred was 100 minutes or more was regarded as acceptable.

—Evaluation Criteria for Electrical Life—
  ⊙: 1000 minutes or more
  ○: 100 minutes or more and less than 1000 minutes
  x: less than 100 minutes The results are shown in the following Table.

In Table above, $\varepsilon$ is the relative permittivity of the entire insulating film at 0.2 atm, and $\varepsilon_0$ is the relative permittivity of the outermost layer of the insulating film at 0.2 atm ($\varepsilon_0$ in Table is $\varepsilon_0$ specified in the claims, and has a different meaning from $\varepsilon_0$ (vacuum permittivity) in the abovementioned equation for calculating the relative permittivity).

As indicated in Table above, when the insulating film has a single-layer structure, the partial discharge inception voltage decreased particularly under low atmospheric pressure, and dielectric breakdown easily occurred (Comparative Examples 1 and 2). Even when the insulating film had a multilayer structure and the relative permittivity of the outermost layer was relatively increased with the relative permittivity of the entire insulating film being decreased, the partial discharge inception voltage under low pressure could not be sufficiently increased unless $\varepsilon_0/\varepsilon \geq 1.2$ was satisfied (Comparative Example 3).

On the other hand, in all the insulated wires in which the insulating films satisfied the requirements of the present invention, the partial discharge inception voltage was effectively increased even in a low-pressure environment, and dielectric breakdown hardly occurred (Examples 1 to 6).

Having described our invention as related to the present embodiments, it is our intention that the invention not be limited by any of the details of the description, unless otherwise specified, but rather be construed broadly within its spirit and scope as set out in the accompanying claims.

DESCRIPTION OF SYMBOLS

1 Insulated wire
11 Conductor
12 Insulating layer (inner layer)
13 Insulating layer (outermost layer)
14 Insulating film
30 Stator
31 Stator core
32 Slot

TABLE 1

|  | Ex. 1 | Ex. 2 | Ex. 3 | Ex. 4 | Ex. 5 | Ex. 6 | CEx. 1 | CEx. 2 | CEx. 3 |
|---|---|---|---|---|---|---|---|---|---|
| Insulating layer 1 | PI | Bubble PI | PI | PI | PI | PI | PAI | PI | Bubble PI |
| (thickness μm) | (45) | (70) | (5) | (5) | (5) | (5) | (25) | (50) | (70) |
| Insulating layer 2 | None | None | Bubble PI | Bubble PI | Bubble PI | Bubble PI | None | None | None |
| (thickness μm) |  |  | (85) | (85) | (85) | (125) |  |  |  |
| Insulating layer 3 | PAI | PI | PI skin layer | PI | PI + SiO$_2$ | PI + TiO$_2$ | None | None | PI |
| (thickness μm) | (5) | (5) | (0.5) | (10) | (10) | (10) |  |  | (5) |
| T | 50 | 75 | 90.5 | 100 | 100 | 140 | 25 | 50 | 75 |
| T$_0$ | 5 | 5 | 0.5 | 10 | 10 | 10 | — | — | 5 |
| T$_0$/T | 0.1 | 0.067 | 0.006 | 0.1 | 0.1 | 0.071 | — | — | 0.067 |
| $\varepsilon$ | 3.0 | 2.5 | 2.0 | 2.0 | 2.0 | 1.9 | 4.2 | 3.0 | 2.8 |
| $\varepsilon_0$ | 4.2 | 3.0 | 3.0 | 3.0 | 3.1 | 4.5 | 4.2 | 3.0 | 3.0 |
| $\varepsilon_0/\varepsilon$ | 1.4 | 1.2 | 1.5 | 1.5 | 1.6 | 2.4 | 1.0 | 1.0 | 1.1 |
| PDIV 1 atm | ○ | ○ | ⊙ | ⊙ | ⊙ | ⊙+ | X | ○ | ○ |
| 0.2 atm | ○ | ○ | ⊙ | ⊙ | ⊙ | ⊙ | X | X | X |
| Electrical life (0.2 atm) | ○ | ○ | ○ | ○ | ⊙ | ⊙ | X | X | ○ |

Remarks:
'Ex.' means Example according to this invention, and
'CEx.' means Comparative Example 33 Coil
34 Wire segment
34a Open end

The invention claimed is:

1. An insulated wire, comprising:
a conductor; and
an insulating film provided on an outer periphery of the conductor, wherein the insulating film satisfies the following relation at 0.2 atm between a relative permittivity ($\varepsilon$) of the insulating film and a relative permittivity ($\varepsilon_0$) of an outermost layer of insulating layers constituting the insulating film:

$\varepsilon \leq 2.4$ and $\varepsilon_0/\varepsilon \geq 1.2$.

wherein the insulating film satisfies the following relation between a thickness (T) of the insulating film and a thickness ($T_0$) of the outermost layer of the insulating film:

$0 < T_0/T \leq 0.1$ and $T \geq 30$ μm, wherein each of the insulating layers constituting the insulating film is made of a resin material containing polyimide or polyamide imide, and
wherein the insulating film has two or three layers.

2. The insulated wire according to claim 1, wherein at least one of the insulating layers constituting the insulating film is a bubble-containing layer.

3. The insulated wire according to claim 2, wherein a porosity of the bubble-containing layer is 5 to 70 vol %.

4. The insulated wire according to claim 2, wherein the bubble-containing layer is an enamel layer formed by baking a thermosetting resin.

5. The insulated wire according to claim 1, wherein the outermost layer of the insulating film contains an inorganic microparticle.

6. The insulated wire according to claim 5, wherein the inorganic microparticle contains titanium dioxide.

7. A coil, comprising the insulated wire according to claim 1.

8. An electrical or electronic equipment, comprising the coil according to claim 7.

* * * * *